United States Patent [19]
Trunzo et al.

[11] 3,811,005
[45] May 14, 1974

[54] GLASS-MICA COMPOSITE STRUCTURE CONTAINING DEPHENYL OXIDE B-STAGE RESIN

[75] Inventors: Floyd F. Trunzo, Monroeville; Gerhard R. Sprengling, Blairsville; Edward J. Traynor, Bedford; Dow A. Rogers, Jr., Pittsburgh, all of Pa.

[73] Assignee: Westinghouse Electric Corporation, Pittsburgh, Pa.

[22] Filed: Feb. 23, 1972

[21] Appl. No.: 228,586

[52] U.S. Cl............ 174/121 SR, 161/93, 161/163, 161/165, 161/171, 161/175, 161/185, 174/110 N, 174/120 C, 174/121 R
[51] Int. Cl. ... H01b 7/28, B32b 17/10, B32b 27/12
[58] Field of Search ............ 161/93, 163, 185, 171, 161/165, 175; 174/121 R, 121 SR

[56] References Cited
UNITED STATES PATENTS
3,539,438 11/1970 Groff ................................ 161/163
3,660,220 5/1972 Groff ................................ 161/163
3,082,185 3/1963 Deodens ........................... 260/37
3,323,962 6/1967 Sprengling ....................... 156/184

FOREIGN PATENTS OR APPLICATIONS
1,001,438 8/1965 Great Britain .................... 161/171

*Primary Examiner*—Harold Ansher
*Assistant Examiner*—Ellis P. Robinson
*Attorney, Agent, or Firm*—R. D. Fuerle

[57] ABSTRACT

A composite structure is disclosed which comprises a layer of glass cloth and a layer of mica paper impregnated and bonded together with a B-stage dephenyl oxide resin composition. The structure may be in the form of a tape or of a sheet and is used as insulation over electrical conductors. The dephenyl oxide composition preferably comprises a mixture of methoxy methyl diphenyl oxide and chloromethyl diphenyl oxide and a curing catalyst of finely divided silica containing a small amount of iron metal.

15 Claims, 1 Drawing Figure

PATENTED MAY 14 1974 3,811,005
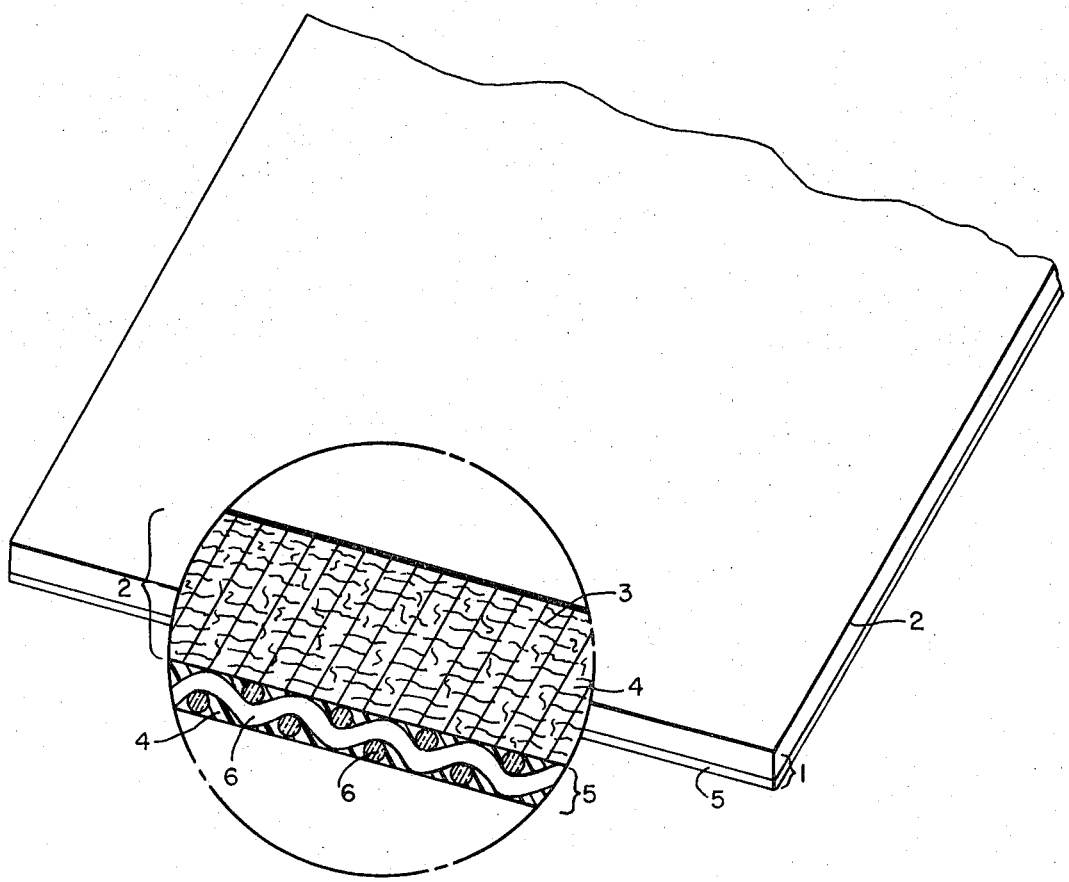

GLASS-MICA COMPOSITE STRUCTURE CONTAINING DEPHENYL OXIDE B-STAGE RESIN

BACKGROUND OF THE INVENTION

Motor and generator windings and many other types of conductors must be wrapped with electrical insulation. Glass-mica composites impregnated with silicone or an epoxy resin have been used for this purpose. Neither of these resins is B-staged so they cannot be made to solidify into the equipment once they are in place. Epoxy resins are only Class B materials which means that they can only be used at temperatures up to about 130°C. Silicone resins are Class H (for use at about 180°C) but they cannot be used in DC machines because upon heating decomposition products form, which deposit on the commutator, are abrasive, and cause excessive brush wear.

Other materials are also unsuitable for various reasons. For example, polyimides are Class H materials but cannot be made into a glass-mica composite tape as they cannot be B-staged and such composites are not flexible. Polyesters are high temperature materials but are degraded by water.

SUMMARY OF THE INVENTION

I have found that a glass-mica composite structure can be made with a diphenyl oxide composition. The composite structure, in the form of a tape or a sheet, is B-staged. It can therefore be wrapped on the conductors and cured in place which results in a unified and stronger insulation. The composite is a Class H material and can be used at temperatures of about 180°C. It is easily wrapped around conductors and will not increase brush wear of DC machines.

DESCRIPTION OF THE INVENTION

The accompanying drawing is an isometric view in section with an enlargement window and illustrates a certain presently preferred embodiment of this invention.

In the drawing, especially the enlargement window, a composite structure 1 has a layer 2 of mica paper 3 impregnated with a diphenyl oxide resin composition 4. The second layer 5 is formed of glass cloth 6 which is also impregnated with diphenyl oxide resin composition 4.

The mica paper is preferably at least about 2 mils thick since below about 2 mils the paper has poor corona resistance and is hard to handle. It is also preferably less than about 6 mils thick since over about 6 mils it is difficult to bend it without breaking it in the finished composite. It is preferable that the average size of the mica flakes in the mica paper be about 20 to about 80 mils for good corona resistance.

The glass cloth is preferably at least about 1 mil thick since below about 1 mil it is not very strong. The glass is also preferably less than about 3 mils thick since more than about 3 mils is unnecessary. The glass cloth is preferably directional with the ratio of yarn in the warp direction to yarn in the fill direction up to about 9.

The diphenyl oxide composition, which is preferably about 20 to about 30 percent (all percentages herein are by weight) of the composite structure, preferably comprises a curing catalyst and a compound having the general formula:

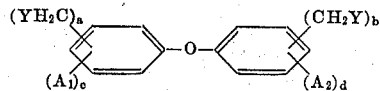

where each Y is independently selected from the group consisting of chlorine, bromine, hydroxyl, and alkoxy from $C_1$ to $C_3$, $a$ is 0 to 3, $b$ is 0 to 3, $a + b$ is at least 1 for at least 85 percent of the molecules present, $A_1$ is alkyl from $C_1$ to $C_{18}$, $A_2$ is alkyl from $C_1$ to $C_{18}$, $c$ is 0 to 3, and $d$ is 0 to 3. Commercially, compounds within the formula are typically sold as a mixture of diphenyl oxide and diphenyl oxide with one or more substitutions. Examples of suitable compounds include methoxymethyl diphenyl oxide, chloromethyl diphenyl oxide, chloromethylbromomethyl diphenyl oxide, hydroxymethylethyl diphenyl oxide and dichloromethylethyl diphenyl oxide. The preferred compound is a mixture of about 90 to about 99 percent methoxymethyl diphenyl oxide and about 1 to about 10 percent chloromethyl diphenyl oxide since the chloromethyl diphenyl oxide is believed to interact with the preferred curing catalyst.

Almost any compound which is a Lewis acid (including compounds which are converted to Lewis acids in the composition) can be used as a curing catalyst. Examples include boron trifluoride, aluminum chloride, tin tetrachloride, ferric chloride, and silica.

The preferred catalyst is about 4 to about 10% (of the total composition) finely divided silica containing a small amount (usually less than about 0.01% stated as ferric chloride and based on the diphenyl oxide compound) of iron because this catalyst has been found to work very well in combination with chloromethyl diphenyl oxide. It is believed that when the chloromethyl diphenyl oxide is cured, it releases hydrochloric acid which reacts with the iron to give a hydrated ferric chloride. The molecularly dispersed hydrated ferric chloride is distributed over the finely divided silica and seems to inhibit the formation of extremely long molecules which would precipitate. While ferric chloride by itself could be used as a catalyst, it is not very soluble and is more effective when distributed over the silica.

METHOD OF MAKING THE COMPOSITE

The diphenyl oxide composition is prepared with sufficient solvent to give a viscosity of about 50 to about 300 seconds Demmler No. 0 cup. At less than about 50 seconds the resin solids are too low and over 300 seconds the composition is so thick that it is hard to handle and does not penetrate into the mica. A good solvent should be non-reactive with the resin and should not affect the catalyst. It should also have a boiling point at least 50°C below the curing temperature of the resin so that it will be completely boiled off before the resin is cured. Aromatic solvents such as benzene, toluene, and xylene work well, but the preferred solvent is a mixture of aromatic solvents cut from petroleum such as "Solvesso 100," a product of Esso Oil Co. If a mixture of solvents is used the higher boiling solvents present keep the resin plasticized while the lower boiling solvents are evaporating, and the formation of blisters is inhibited. The boiling point of at least about 20 percent of the solvent should be solvents which boil over 100°C in order to prevent blistering.

A sheet of glass cloth with mica paper on top, typically about 36 inches wide, is passed over a drum rotating in a bath of the resin composition dissolved in the solvent. A doctor blade removes excess resin from the drum and the remaining resin impregnates the glass and mica. The sheet is then passed through an oven heated to about 150°C which cures the resin to the B-stage. The sheet may then be cut into tape or smaller sheets. It is non-sticky and can be rolled for storage. When used, the tape or sheet are wrapped over the conductors, pressed into place, and cured. Since the conductors are typically impregnated or coated with other resins, all of the curing can be done at the same time and no additional curing step is required.

The following example further illustrates this invention:

EXAMPLE

Into a 25 gallon stainless steel jacketed kettle heated with hot oil was placed 79.5 lbs. methoxymethyl diphenyl oxide, 1.07 lbs. chloromethyl diphenyl oxide, 4.046 lbs. 5 micron silica powder containing about 0.002% iron metal sold by Pennsylvania Pulverizing Co. under the trademark "Minusil." The reactants were heated to 150°C which initiated the polymerization. The heat was turned off and Gardener viscosity measurements were made at 5 to 15 minute intervals. The reaction was stopped when a Gardener "L" viscosity was obtained. After the addition of 26.5 pounds of toluene the resin solids of the batch of resin was 63.3%. This was then diluted with toluene to 100 seconds Demmler No. 0 cup.

A sheet of 1 mil glass cloth with 4 mil mica paper on top 36 inches wide was passed over a drum rotating in the batch of resin. A doctor blade removed excess resin from the drum and the remaining resin impregnated the sheet. The impregnated sheet was passed through a 150°C zoned 60 foot horizontal oven at the rate of 10 feet a minute with resin and was non-blocking and flexible. The resin loading was 28.2%, the thickness 9.0 mils, and the electrical strength 632 volts per mil.

The 36 inch sheet was slit into ¾ inch wide rolls. Three 22 inch long 0.091 inch by 0.289 inch copper wires insulated with "Kapton" film (Du Pont trademark for polyimide film) or a Westinghouse standard insulation of a double glass yarn saturated with Du Pont's "Pyre–ML" polyimide varnish, were stacked and then taped with two half-lapped layers of the abovedescribed tape, one layer at 90° to the other. The wires were then bent into a hair pin shape around a 2¼ inch diameter mandrel. The four sides of each leg of the hair pin were pressed firmly in a hand vice at room temperature. The wires were placed in an air circulating oven and the insulation cured for 16 hours at 200°C. The above hair pin coils were then given two dips in a diphenyl oxidephenolic resin varnish (sold by Westinghouse Electric Corporation under the trademark "DORYL B–501") which was thinned with cellosolve to 58 percent solids and 80 second Demmler No. 1 cup. viscosity at 25°C. After the first dip the coils were air dried for one hour then dried for 2 hours at 80°C, 2 hours at 100°C, and 2 hours at 135°C, and 4 hours at 160°C. After the second dip the coils were air dried for 1 hour then dried for 2 hours at 80°C, 2 hours at 100°C, 2 hours at 135°C, 2 hours at 160°C and 4 hours at 200°C.

Table I shows the improved electrical strength of the diphenyl oxide hair pin coils tested at room temperature and 200°C over similarly prepared hair pin coils using other types of fully loaded tapes. Table I also gives the rate of temperature rise starting at 200°C and at 5,000 volts AC, the voltage increasing stepwise at 1,000 volts a minute. The figures are averages.

Table 1

| Example No. | Insulation System | | | Electric Strength (Room Temp.–KV average) | 200°C Stepwise Electric Strength (KV) | Temperature Rate of Rise (°C/min.) |
| --- | --- | --- | --- | --- | --- | --- |
| | Insulator | Tape | Varnish | | | |
| 1 | PI | PE | DOP | 11.37 | 10.0 | 3.0 |
| 2 | PI | E | DOP | 11.71 | 7.2 | 3.1 |
| 3 | DG | PE | DOP | 10.18 | 8.0 | 3.0 |
| 4 | DG | E | DOP | 9.33 | 6.5 | 3.6 |
| 5 | PI | PE | E | 11.10 | 7.4 | 3.8 |
| 6 | PI | E | E | 10.15 | 8.0 | 4.7 |
| 7 | DG | PE | E | 7.53 | 6.9 | 4.3 |
| 8 | DG | E | E | 9.95 | 7.5 | 3.4 |
| 9 | PI | DO | DOP | 13.14 | 11.8 | 1.4 |
| 10 | DG | DO | DOP | 11.42 | 8.5 | 1.8 |

PI = polyimide sold by Du Pont Co. under the trademark "Kapton"
PE = polyester sold by Westinghouse under the trademark "JC-115" varnish
DOP = diphenyl oxide – phenolic resin varnish sold by Westinghouse Electric Corporation under the trademark "DORYL B-501"
DG = double glass yarn saturated with polyimide, sold by Westinghouse as a standard insulation for magnet wire
E = epoxy resin sold by Sterling Varnish Co. under the trademark "Thermopoxy"
DO = diphenyl oxide (tape of this invention).

Table II shows the percent power factor at 25°C and 200°C. The diphenyl oxide tape systems have 16 to 17 percent power factors at 60 Hz and 200°C compared to 26 to 44 percent for the other systems tested.

Table 2

| Example No. | Insulation System Insulator | Tape | Varnish | 60 Hz | 25°C 400 Hz | 1500 Hz | 60 Hz | 200°C 480 H%Z | 1500 Hz |
|---|---|---|---|---|---|---|---|---|---|
| 1 | PI | PE | DOP | 1.30 | 0.88 | 0.69 | 26.0 | 19.0 | 15.0 |
| 2 | PI | E | DOP | 0.99 | 0.84 | 0.73 | 26.0 | 16.0 | 11.0 |
| 3 | DG | PE | DOP | 1.20 | 0.96 | 0.80 | 28.0 | 11.0 | 11.0 |
| 4 | DG | E | DOP | 1.20 | 0.84 | 0.69 | 26.0 | 18.0 | 14.0 |
| 5 | PI | PE | E | 1.20 | 0.96 | 0.80 | 27.0 | 20.0 | 15.0 |
| 6 | PI | E | E | 1.10 | 0.76 | 0.65 | 29.0 | 24.0 | 19.0 |
| 7 | DG | PE | E | 1.20 | 1.00 | 0.91 | 41.0 | 25.0 | 17.0 |
| 8 | DG | E | E | 1.80 | 1.20 | 0.93 | 44.0 | 31.0 | 22.0 |
| 9 | PI | DO | DOP | 1.40 | 0.80 | 0.72 | 17.4 | 8.4 | 6.0 |
| 10 | DG | DO | DOP | 1.49 | 0.46 | 0.54 | 16.2 | 7.2 | 3.8 |

Symbols are the same as used in Table 1.

The coils with the diphenyl oxide tape were subjected to a steam atmosphere for 5 hours at 158°C and 60 psi. The insulation resistance was unchanged and withstood a 1 minute 2,200 volts AC test.

In another experiment good bonding of two square inches of overlapped tape was obtained after 1 hour at 200°C under a load of 10 pounds.

In still another experiment, a tape was prepared according to the invention, and after 12 days of aging at 200°C, the weight loss of the resin in the tape was 4.46% compared to 7.95% for an identically prepared tape using a polyester resin. After 21 days at 225°C the weight losses were 7.95% and 25.4% respectively. The diphenyl oxide impregnated tape remained flexible after 4 months of storage at room temperature.

We claim as our invention:

1. A flexible composite structure comprising a layer of woven glass cloth and a layer of mica paper, each layer impregnated and bonded together with a B-stage diphenyl oxide resin composition.
2. A composite structure according to claim 1 in the form of a tape.
3. A composite structure according to claim 1 in the form of a sheet.
4. A composite structure according to claim 1 wherein said glass cloth is directional and the warp direction to fill direction of ratio of yarn is up to about 9.
5. A composite structure according to claim 1 wherein said layer of glass cloth is about 1 to about 3 mils thick.
6. A composite structure according to claim 1 wherein said layer of mica paper is about 2 to about 6 mils thick.
7. A composite structure according to claim 1 wherein said diphenyl oxide composition is about 20 to about 30 percent of said structure.
8. A composite structure according to claim 1 wherein the average size of the mica flakes in the mica paper is about 20 to about 80 mils.
9. A composite structure according to claim 1 wherein said diphenyl oxide composition comprises (A) a compound having the general formula:

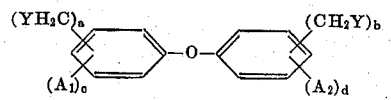

where each Y is independently selected from the group consisting of chlorine, bromine, hydroxyl, and alkoxy from $C_1$ to $C_3$, $a$ is 0 to 3, $b$ is 0 to 3, $a + b$ is at least 1 for at least 85 percent of the molecules, $A_1$ is alkyl from $C_1$ to $C_{18}$, $A_2$ is alkyl from $C_1$ to $C_{18}$, $c$ is 0 to 3, and $d$ is 0 to 3, and (B) a curing catalyst for said compound.

10. A composite structure according to claim 9 wherein said compound is a mixture of about 90 to about 99% methoxymethyl diphenyl oxide and about 1 to about 10% chloromethyl diphenyl oxide and said catalyst is about 4 to about 10% finely divided silica containing less than about 0.01% (based on said diphenyl oxide compound) iron stated as ferric chloride.
11. A composite structure according to claim 1 wrapped around a conductor and cured.
12. A composite structure according to claim 1 wherein said B-stage diphenyl oxide resin composition has up to an "L" Gardener viscosity.
13. A composite structure according to claim 9 wherein said curing catalyst is selected from the group consisting of boron trifluoride, aluminum chloride, tin tetrachloride, ferric chloride, and silica.
14. An insulated electrical member comprising
    A. at least one electrical conductor;
    B. a film containing a polyimide resin wrapped around said electrical conductor; and
    C. a flexible composite structure which comprises a layer of woven glass cloth and a layer of mica paper, each layer impregnated and bonded together with a B-staged diphenyl oxide resin composition.
15. An insulated electrical member according to claim 14 wherein said composite structure is in a cured state.

* * * * *